Figure 1:
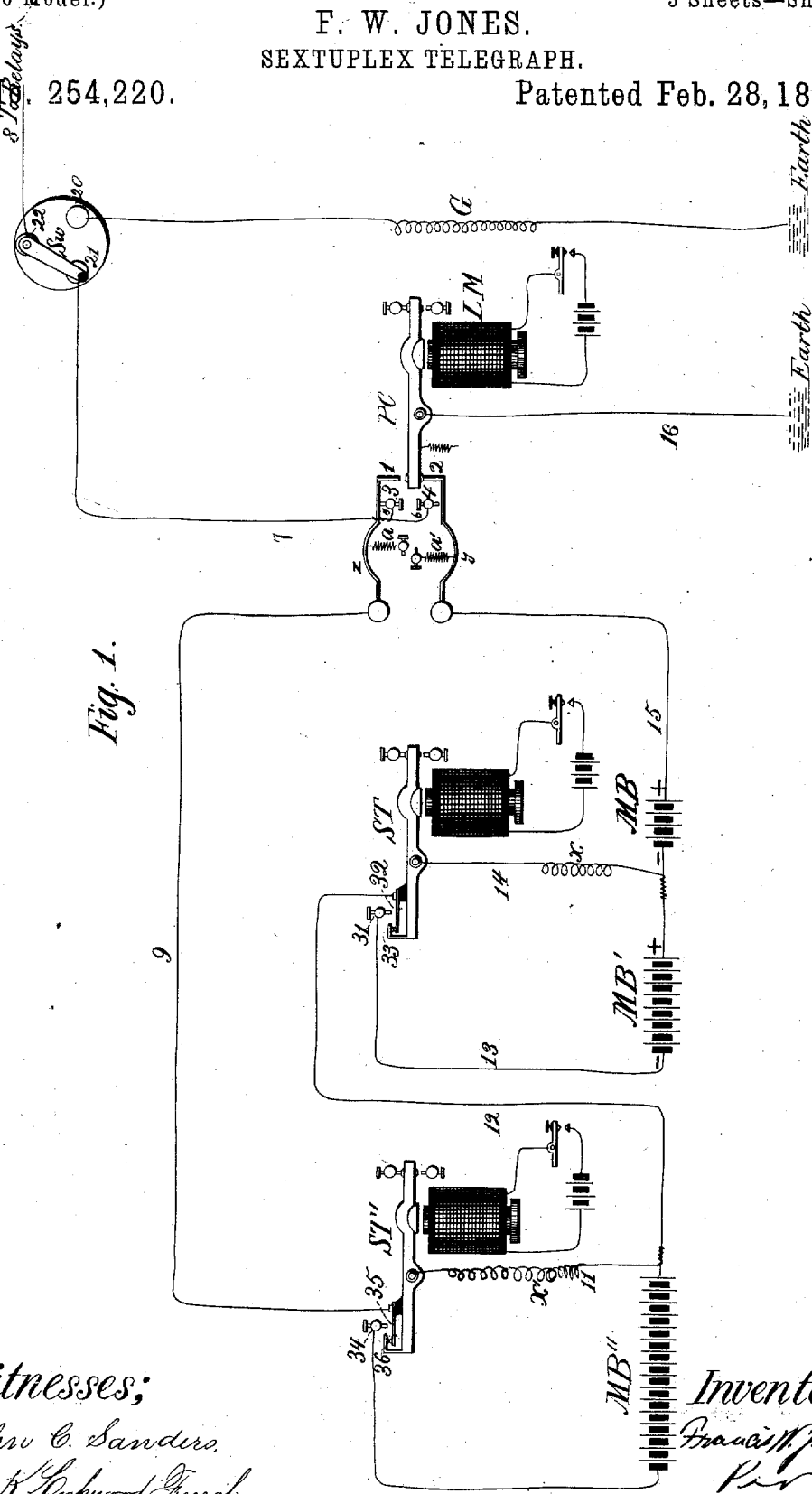

(No Model.)

F. W. JONES.
SEXTUPLEX TELEGRAPH.

No. 254,220. Patented Feb. 28, 1882.

3 Sheets—Sheet 3.

Witnesses:
John C. Sanders.
Mrs. K. Lockwood French.

Inventor,
Francis W. Jones
Per C. L. Buckingham
Atty

UNITED STATES PATENT OFFICE.

FRANCIS W. JONES, OF NEW YORK, N. Y.

SEXTUPLEX TELEGRAPH.

SPECIFICATION forming part of Letters Patent No. 254,220, dated February 28, 1882.

Application filed February 9, 1881. (No model.)

*To all whom it may concern:*

Be it known that I, FRANCIS W. JONES, of the city, county, and State of New York, have invented a new and useful Improvement in Sextuplex Telegraphs, of which the following is a specification.

My invention consists of improvements in respect to the transmitting and receiving telegraphic apparatus of a system whereby three independent messages may be sent in one direction while three messages are being sent in the opposite direction over one line-conductor.

Heretofore systems have been devised by which one message may be sent wholly by reversals of current, while two others could be sent simultaneously in the same direction from the same station by successively increasing the current strength. In such systems a weak battery is normally connected to line and earth through a pole-changing key. By operating such key the poles of the weak battery are reversed in respect to the earth and line and signals are transmitted. At the same station two additional battery-sections and two ordinary continuity-preserving keys are provided, whereby the strength of current from the battery normally to line may be successively increased three times. By closing the first continuity-preserving key the current from the battery normally to line receives its first increase. By closing the second continuity-preserving key a second increase results, while a simultaneous closing of both continuity-preserving keys gives a third increase. The three increases of current result, first, from the insertion to line of a second battery stronger than the one normally to line; second, from an insertion of a third and still stronger battery; and the third increase is due to the insertion of both the second and third batteries. The second and third batteries are so inserted that they form an addition to the weak battery normally to line, and a reversal of the weak battery is accompanied by a reversal of either or both of the stronger batteries upon the line, providing they are connected to line through the closing of the second and third keys. At the receiving-station there is a combination of main-line relays and local sounders, consisting of a main-line polarized relay, which brings into action a local sounder by the reversal of the main-line currents, regardless of their strength. In addition to the polarized relay, neutral relays are provided, by means of which either or both of two local sounders may be brought into action either when the local sounder controlled by the polarized relay is or is not operating. The reversal of the weak battery normally to line will operate the polarized relay and actuate the first local sounder, but will not suffice to affect the neutral relays. The first increase of current upon the line will cause the first neutral relay to actuate the second local sounder. The second increase of current will actuate the second neutral relay to give a signal upon the third local sounder, and while the second increase of current will actuate the armature of the first neutral relay, it will actuate other devices to prevent the second local sounder from operation. The third increase of current operates neutral-relay devices to cause the simultaneous production of signals upon both the second and third local sounders. This invention, therefore, I do not broadly claim as my own, but desire to limit myself to improvements thereon.

My improvement in respect to transmitting devices consists of such an arrangement of keys, circuit-connections, resistances, and batteries that either or both of the stronger battery-sections, which are normally out of the main-line circuit, may be placed therein in tension with the weak battery, which is always upon the line, in such manner that incoming currents from the distant station shall encounter the same resistance when one or both of the stronger batteries are in the main-line circuit; also, the arrangement of resistances and batteries is such that all the outgoing currents, as well as incoming, shall meet the same resistance at the transmitting-station whether the stronger sections of main-line battery are or are not connected in circuit. The first or weakest battery-section is continually in the main-line circuit, and is operated to charge the main line with alternately positive and negative currents by a reversing-key, whereby one operator is enabled to send signals by means of reversals of current independently of changes in strength. Two additional operators are enabled each to send a set of signals from the same station by means of changes in strength of current independently of reversals. Two transmitting-keys for sending signals by changes in strength of current are located upon a single continuous conductor forming a fragment of the main-line circuit. Both ends of said fragment of the main-line circuit are connected with a reversing-key, which also effects the transmission of signals from the weaker section of battery, and the opposite ends of the said main-line fragment are alternately changed from line to earth and earth to line, and vice versa. In connection with each of the transmitting-keys for sending signals by changes in strength are two conducting-branches, through either of which the electrical continuity of the fragment of the main-line circuit may be maintained. One of said conducting-branches has thereon a section of main-line battery, while the other branch has an artificial resistance therein equal in amount to the resistance of the battery-section. When the transmitting-key is upon its back-stop the branch having the battery-section is broken, while the branch having the artificial resistance at the same time serves to maintain electrical continuity throughout said fragment of the main-line conductor. However, when the key is pressed upon its front contact the branch having the artificial resistance is broken, and the circuit is maintained through the branch having the battery-section, and said battery-section is placed to line for the purpose of effecting a signal at a distant station, and at the same time the main-line resistance is maintained unchanged in respect to currents arriving at the home station from a distant one. The two transmitting-keys are by this arrangement placed in different portions of a single conductor.

My invention in respect to the receiving devices relates to the main-line relays, their circuit-connection, and local sounders. The first local sounder is controlled by the action of a polarized relay, which is actuated by reversals of the weak battery normally to line, or by the reversals of currents from either or all of the batteries at the transmitting-station combined. This feature, however, *per se*, forms no part of my invention. The second local sounder is actuated by a double differentially-wound local relay. By virtue of two differential windings upon the single relay four independent coils are provided, two of which branch from one local battery, while the remaining two coils branch from a second local battery. Such local branches are opened and closed by the action of main-line neutral relays, through the agency of currents of increased strength, though never by reversals. When the main-line current receives its first increase, or the second operator closes his key, the first neutral relay at the receiving-station responds and breaks one of the four local branches of the double differential local relay. When the four branches of said relay are all closed the magnetic effects in the relay are neutral; also, when either differential set of the relay-coils is closed the magnetic effects are likewise neutral. The first increase of line-current is not sufficient to operate the second neutral relay, which controls the second local branch of the local relay. Thus when the main-line current receives its first increase one local branch is broken, and the local relay responds to operate the second local sounder. Now, if the main-line current receive its second increase of current from the third operator, the first main-line neutral relay will still respond to break one of the local branches of the double differential relay; but at the same time the second neutral relay operates to also break the second of the first set of differential or oppositely-wound coils upon the local relay, which branch also operates the second sounder; but, as above observed, when one differential set of oppositely-wound coils is alone closed in the local relay a balance will ensue and magnetic effects will be neutral. While the action of the second neutral relay is such as to prevent the first neutral relay from actuating the second local sounder, the action of the second neutral relay at the same time breaks a local circuit to bring into action the third local sounder.

My invention thus far explained provides for the separate operation of either of the second or third local sounders; but a further device is necessary to enable both sounders to simultaneously operate. Such result is accomplished by the third increase of battery-current strength, which serves to give the second neutral main-line relay an additional movement, or else to actuate a third main-line relay, by means of which one branch of the second differential set of local coils of the local relay is broken, thus leaving said differential local relay subject to the action of a single local coil, whereby the magnetic balance is destroyed, and operation of the second local sounder is the consequence. The greatest strength of current operates all of the main-line relay-armatures, and the third local sounder will work as when the next lower strength of current is to line. As the main-line neutral relays are subject to three widely-varying tensions of current, I provide local counteracting electro-magnets, to be called into action when increased currents are sent. A retractor properly adjusted to correspond with the strength of current necessary to actuate the first or weakest neutral relay would be out of adjustment in the case of current strength sufficient to operate the next neutral relay. Therefore I make the currents sent to line, which are too strong for the adjustments of the retractors, call into action local electro-magnets to aid such retractors. It is obvious that a differential winding of the main-line relays will enable three messages to be simultaneously sent in opposite directions.

I will now explain my invention by reference to the accompanying drawings, which form a part of my specification.

Figure 2:
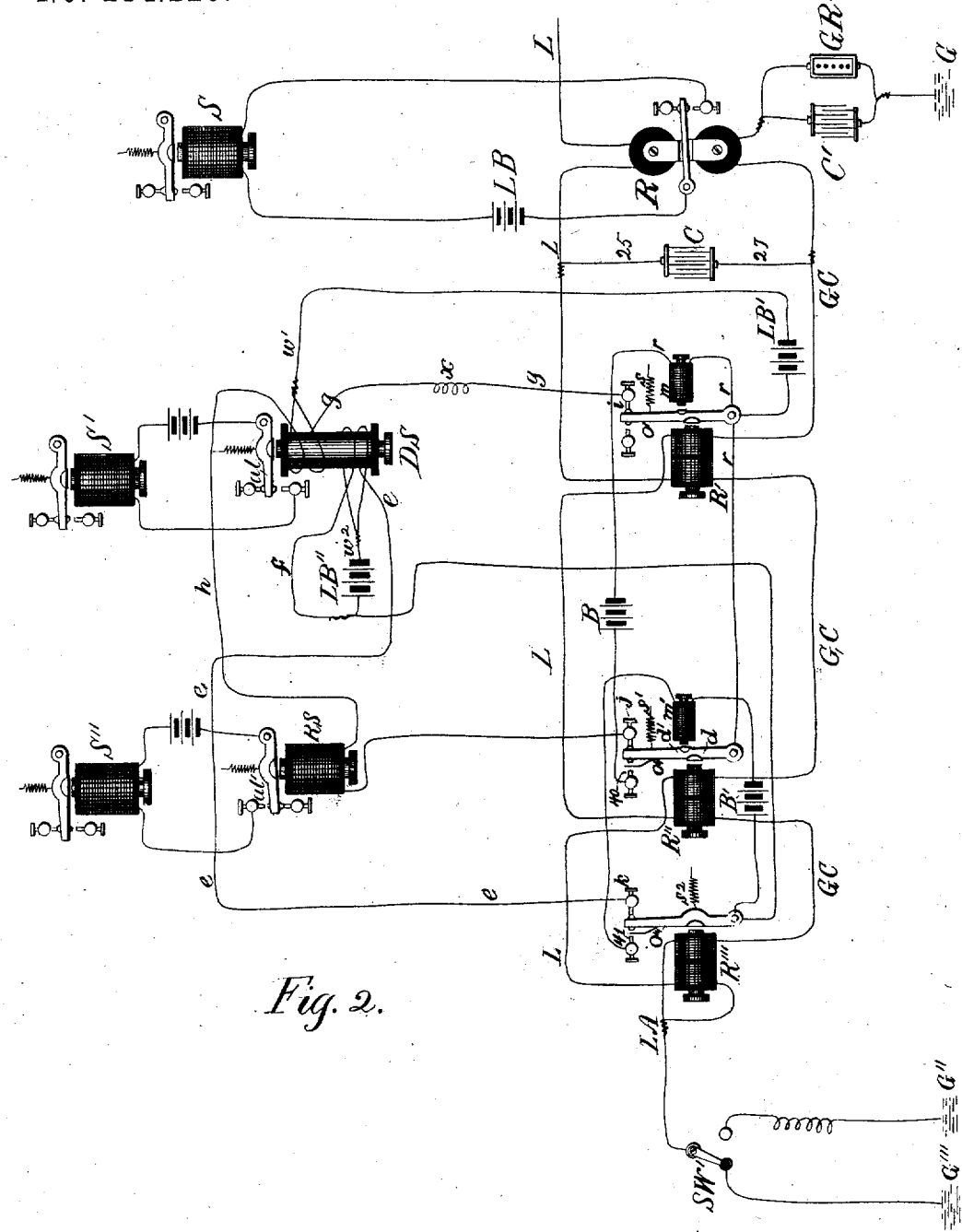

Figure 1 represents the transmitting-keys, batteries, and circuit-connections necessary for the transmitting end of the line. Fig. 2 represents the main-line relays, local relays, local sounders, circuit-connections, and devices employed at the receiving end of the line. Fig.

3 represents a modification of devices illustrated in Fig. 2.

Like letters of reference in the drawings indicate corresponding parts.

As shown in Fig. 1, P C is a pole-changing key by means of which main-line batteries M B M B' M B'' are connected to line and earth, and through the agency of which the poles of the batteries may be reversed in respect to the line and earth.

$z$ and $y$ are springs tending to rest upon stops 3 and 4. Main line 7 is joined to stops 3 and 4 by wires 5 and 6. Key P C is connected to earth through 16.

S T and S T' are ordinary continuity-preserving keys, by means of which batteries M B' and M B'', normally cut out, may be put in main-line circuit by closing the keys.

Transmitting-keys S T and S T' are located upon a fragment of the main-line circuit, having its ends connected with the springs $z$ and $y$ of key P C, and said fragment consists of conductor 15, battery M B, and branches 13 or 14, transmitting-key S T, conductor 12, branches 10 or 11, key S T', and conductor 9. By operation of the pole-changing key P C the opposite ends of this fragment of main-line conductor are alternately reversed from line to earth and earth to line, and vice versa.

It will be observed that the keys S T and S T' are situated at different positions in the length of one conductor, and that the fragment of the main line containing said transmitting-keys has only a single earth-connection, 16. When key S T is open battery M B is closed to line through wire 14, containing resistance $x$. When S T is closed M B is connected to line through battery M B', 13, 31, and 12. When S T' is open M B and M B' are joined to line through resistance $x'$ of 11, key S T', 36, and 35. If S T' be closed, the main-line circuit will not be closed through $x'$, but through M B'', 10, 34, 35, and 9. Resistances $x$ and $x'$ are made equal respectively to the resistances of batteries M B' and M B'', since both incoming and outgoing currents will traverse either resistances $x$ $x'$ or batteries M B' M B'', according to the positions of keys S T and S T'.

M B is a weak battery, whose relative strength may be represented by 1. M B' is a stronger battery, whose strength is 2, and M B'' is of strength 4. By reversing currents upon the line a polarized armature at the receiving-station is operated.

M B' and M B'' are added in circuit by closing keys S T and S T' to increase the strength of current of M B. When keys S T and S T' are closed, M B' and M B'', as well as M B, are reversed upon the line by operating P C. The several current strengths upon the line are, normally, strength −1; key S T closed, S T' open, strength −3; key S T open, S T' closed, strength −5; key S T closed, S T' closed, strength −7. When P C is closed the currents are respectively +1 +3 +5 +7.

It will be seen from this description that my key system enables eight different conditions of current to be sent to line, and that the battery-sections and resistances are so arranged that a circuit of constant resistance is always provided for all incoming and outgoing currents.

S W is a switch by means of which the key system may be disconnected and the line put to earth through resistance G equal to resistance of the key system, whereby the distant relays may be conveniently balanced.

In Fig. 2, which represents my receiving apparatus, R is a polarized relay controlling local sounder S. Relay R responds to a reversal of current strength of 1. It will also respond as well to a reversal of current of strengths 3, 5, or 7. Thus sounder S will respond while strong currents operate the neutral relays for independent signals. R is the first main-line neutral relay, and is operated by a current of either polarity of strength 3 or currents from M B and M B' jointly. R'' is the second neutral relay, and will respond to currents of either polarity of strength 5 or currents from M B and M B'' jointly. R''' is the third neutral relay, which will respond to either polarity of current of strength 7 or current from M B M B' M B'' jointly. S' is the second local sounder, which is to be brought into action by key S T. The local circuit of S' is opened and closed through the agency of the double differential local relay D S.

Relay D S is differentially wound with the two branches $h$ and $g$ of wire $w'$, leading from one pole of local battery L B'. Branch $h$ is connected to the back stop of relay R'', and branch $g$ is connected to back stop of relay R', while armature-levers $o'$ and $o''$ of R' and R'' are joined to the opposite pole of L B'. Relay D S is also differentially wound with branches $f$ and $e$ from wire joined to one pole of local battery L B''. Branch $e$ is carried to back stop $k$ of relay R''', from which connection is made through the armature $o'''$ to the opposite pole of L B''. Branch $f$ is also connected with branch $e$ to the same local-battery pole.

It will be observed that the third local sounder is controlled by relay R S, placed in the branch $h$, forming one coil of the first differential set of coils upon double differential relay D S.

Coils $g$ and $h$ are oppositely-wound differential coils connected with the poles of local battery L B'. Thus when both branches are closed the magnetic effects in D S due to L B' are neutral. Also, $f$ and $e$ are oppositely-wound differential coils connected with local battery L B'', and magnetic effects in D S due to L B when both $e$ and $f$ are closed are neutral.

The operation of local sounders S' and S'' may now be explained. Normally the four branches $e$, $f$, $g$, and $h$ of the double differential windings upon D S are closed and no magnetism is developed to attract armature-lever $a l$; but if a strength of current 3 be sent to line of either polarity the neutral relay R' responds and lever $o'$ is withdrawn from back stop $i$ and the branch $g$ is broken, and D S will be subject to the action of the remaining three coils, $e, f,$ and $h$. Coils $e$ and $f$ neutralize each other; but coil $h$ develops magnetism and armature-lever $a\ l$ closes the local circuit of sounder S'. However, when a current of strength 5 is sent to line not only will armature of R' be moved and branch $g$ be broken, but armature of second neutral relay, R'', will cause $o''$ to be drawn from back contact $j$ to break branch $h$. When branches $g$ and $h$ are both broken relay D S is subject only to the effects of differential coils $e$ and $f$, which are neutral. Therefore armature-lever $a\ l$ will not close the local of second local sounder S'. A current strength of 3 is sufficient to break one of four differential branches of D S to destroy magnetic equilbrium, while a current strength of 5 operates to break two branches, and thus re establish magnetic equilibrium; but while the breaking of $h$ establishes magnetic equilbrium in D S to leave S' unaffected, the breaking of branch $h$ demagnetizes R S, and $a\ l'$ moves to its back stop to close the local of $s''$ to give a signal upon the third local sounder. Again, when a current due to the joint action of all the batteries or of strength 7 is sent to line both local sounders S' and S'' should operate. When current 7 of either polarity is sent to line, armature-levers of all the local relays R', R'', and R''' are withdrawn from their back stops, and three of the differential branches, $e, g,$ and $h,$ of D S will be broken, and branch $f$ will alone remain closed, when again the magnetic equilibrium of D S will be destroyed and $a\ l$ will close the local of S' to give a signal; also, as $h$ is broken at the same time, S'' will simultaneously respond.

In winding the double differential relay with its four coils in branches $e, f, g,$ and $h$ it is apparent that coils of branches $f$ and $g$ must each be wound and connected to their batteries in such a manner that they may each tend to polarize D S alike—that is, if $f$ causes a north magnetic pole in the upper part of D S, $h$ likewise should be wound to induce a coincident north pole in the upper part of D S. Should $f$ and $h$ induce opposite magnetic polarities in D S at certain times, a reversal of polarity in D S would occur. For example, if all the branches but $f$ were broken, D S would be charged by $f$. Therefore, if $f$ induce a north pole in the upper part and a south pole in the lower part, this polarity would be wholly reversed when $g$ alone is broken, as at such time $e$ and $f$ neutralize each other and magnetic effects in D S would be due to $h$ alone. When key S T alone is operated magnetism in D S is wholly due to coils of branch $h$. When both keys S T and S T' are operated magnetism in D S is wholly due to coil in branch $f$. Therefore to avoid a reversal of magnetic polarity in core of D S coils of branches $f$ and $h$ must both induce in each end of D S magnetism of the same polarity. If both keys S T and S T' are closed to operate both sounders S' and S'', relay D S will have a given magnetic polarity. If, now, key S T' be opened, the polarity of D S will not be reversed, nor will its magnetic strength even be reduced, and no flutter of armature-bar $a\ l$ will occur to mutilate signals upon S'. Armature-levers of R', R'', and R''' all close the local sounder-circuits upon their back contacts. Thus when the armature-levers are attracted a reversal of line-current that would reverse the magnetic polarity of R', R'', or R''' would occur too rapidly to permit the armature-levers to close one back contact, even if they were to move back slightly from the poles of the relays.

To still further obviate all possible difficulty from the momentary release of the relay-armatures upon reversal of current, I introduce between relays R and R' condenser C, which is joined by conductors 25 and 27, respectively, to main line L and artificial circuit G C. If a current from line passes over L A to G''' it will charge condenser C in such a manner that when the line-current is broken the condenser will discharge and effect a continuation of the previously-broken current up to the time that a reverse current is sent over the line, thus filling the gap in the current at the moment of reversal. The discharge of the condenser occurs through the circuit 25, L to L A, thence over G C and 27 back to condenser C. This device, however, is covered in my Patent No. 191,439, of 1877, and I make no claim to it in this application.

A further part of my invention consists in employing local magnets $m$ and $m'$ with relays R' and R''. Armature of relay R' is obliged to act under three different strengths of current, while armature of R'' is operated by two different strengths of current.

It is desirable that a definite ratio be established between the attractive and retractile forces upon a relay-armature. If the current be strong, the tension of the retractile spring should be adjusted high. Thus, if the retracting-spring of relay R' be adjusted for a current strength of 3, its adjustment would be wrong for a current-strength of 5 or 7—that is, the tension of the retractor would be too low.

To compensate for a high strength of current I cause a local circuit to be closed by the effects of such a high strength of current, and the local circuit acts in aid of the weak retractor. If spring $s$ of relay R' is adjusted for a current of strength 3, a current of strength 5 would overpower $s$; but as the current 5 actuates armature of R'' to close on front contact local circuit of battery B and magnet $m$, $m$ acts in conjunction with $s$, and the retractile force upon lever $o$ is automatically increased and made to bear the same ratio to the current 5 that the force of spring $s$ alone bears to force of current 3. It is obvious that according to the same plan the retractile force of $s$ could be still further aided by calling in more local battery by the action of relay R''' when current of strength 7 is sent. A local electro-magnet, $m'$, is applied in the same manner to aid the retractile force of $s'$. $m'$ is only called into action when a current of strength 7 is sent to line.

Local electro-magnets $m$ and $m'$ will act upon their respective armatures when armatures $o'$ and $o''$ of $R''$ and $R'''$ are upon their front contacts; but, should the front contacts be momentarily broken by reversals of the main-line current, $m$ or $m'$ would exert a variable retracting force. To avoid such difficulty I have placed springs 40 and 41 upon the ends of armature-levers $o''$ and $o'''$, leaving a slight range of movement of the armature without breaking the local of $m$ or $m'$. Thus the front contact may be preserved even if armature-bars $o'$ and $o''$ are slightly vibrated upon reversals of current.

It is obvious that many equivalents of springs 40 and 41 may be employed to preserve a front contact to avoid breaking the locals of $m$ or $m'$, and I do not limit myself to the use of springs alone.

Figure 3:
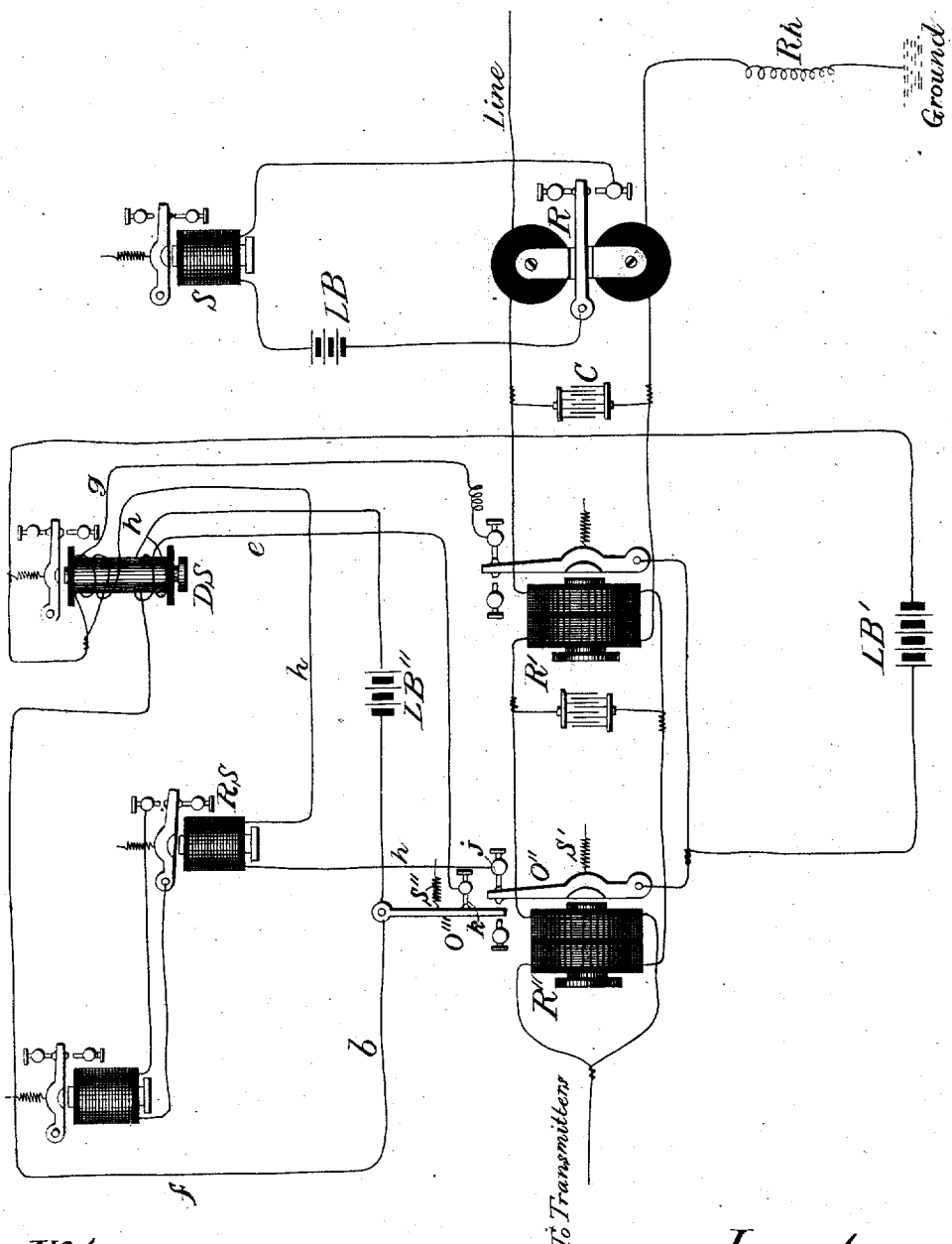

Fig. 3 illustrates a modification of the receiving system shown in Fig. 2. Fig. 2 shows a third neutral relay, $R'''$, which responds only to currents of the highest tension. Instead, however, of employing a separate relay, $R'''$, which shall respond only to currents of the highest tension, I may modify the relay $R''$, which, as shown in Fig. 2, only responds to currents of the next highest tension by rendering the armature of said relay susceptible to a certain movement by one strength of current and to a further movement by the highest or greatest strength. The function of $R'''$ is to break the branch $e$ of relay D S, and this result may be accomplished by a second or additional movement of the armature of $R''$. Fig. 3 shows a relay, $R''$, substantially the same as relay $R''$ of Fig. 2, with the exception that the front stop of armature $o''$ consists not of a fixed anvil, but a lever, $o'''$, held by a retractile spring, $s''$. The next to the highest strength of current employed is sufficient to attract armature $o''$ and overcome spring $s'$ against the lever $o'''$; but this strength of current is not adequate to overcome the retractile spring $s''$. However, by an additional strength of current not only is armature $o''$ attracted and spring $s'$ overcome, but the lever $o'''$ is moved from its stop $k$ against the action of spring $s''$ and the branch $e$ is broken. It is therefore to be observed that the first movement of armature $o''$ serves to break the branch $h$, while the second movement of that due to the highest strength of current causes the branch $e$ to be broken.

Throughout this specification I have designated the strengths of battery as bearing the relation of one, two, and four to each other, though I do not limit myself to such proportions, as they may under different circumstances be widely varied.

While I have thus far described my invention as an element of a sextuplex telegraph, it is obvious that I could dispense with the pole-changing key P C at the transmitting-station and the main-line polarized relay R and local sounder S at the receiving-station, and thereby have a complete quadruplex capable of operation without reversals of current. My device therefore will enable double sending from one end of a line by changes of tension of current alone.

In an earlier application for a patent filed by me I have specifically set forth and claimed a transmitting or key system arranged upon a single conductor, consisting of the combination of a fragment of said conductor and a series of transmitting-keys thereon and two branch conductors at each transmitting-key, through either of which branches the main-line circuit may be established, one of said branches being normally open, having thereon a section of main-line battery, and the other branch normally constituting a portion of the main-line circuit, having an artificial resistance substantially equal to that of the battery and the normally-open branch, the two branches of each key being so combined with said key that by its movement the two branches may each separately and alternately be placed in the main-line circuit; wherefore I desire to disclaim such matter from this case in favor of my application of earlier date when not employed in combination with a pole-changing key.

What I claim, and desire to secure by Letters Patent, is—

1. In a system for simultaneous transmission upon a single line, a transmitting or key system arranged upon a single conductor, consisting of the combination of a fragment of said conductor, whose ends may be reversed by means of pole-changing key in respect to the earth and main-line connections and a series of tension-changing transmitting-keys thereon, and two branch conductors at each transmitting-key, through either of which branches the main-line circuit may be established, one of said branches being normally open and having thereon a section of main-line battery, and the other branch normally constituting a portion of the main-line circuit, having an artificial resistance substantially equal to that of the battery in the normally-open branch, the two branches of each key also being so arranged with said key that by its movement the two branches may each separately and alternately be placed in the main-line circuit, substantially as described.

2. A fragmentary portion of a main-line conductor, the opposite ends of which are connected to a main-line pole-changer, said fragmentary portion of the main line having its continuity preserved through the branches having the resistances $x$ $x'$ when the transmitting-keys are upon their back stops, and through the battery-branches of M B$'$ and M B$''$ when the keys are upon their front stops, substantially as described.

3. The combination, substantially as described, of the pole-changing key P C, connected to earth, conductor 15, main-line battery M B, branches 13 and 14, having respectively sections of battery M B$'$ and resistance $x$, transmitting-key S T, conductor 12, branches 10 and 11, having respectively section of main-line battery M B″ and resistances x′, transmitting-key S T′, conductor 9, and main line 7, substantially as set forth.

4. In a telegraphic system for simultaneously sending three messages upon the same conductor in one direction, the combination, substantially as set forth, of a polarized relay and local sounder and a system of neutral relays whose armatures make and break at their back contacts three separate local circuits, whereby the second and third local sounders are operated to receive signals.

5. The combination of a series of neutral main-line relays, which are operated in succession by successive increases in strength of current, and a series of independent and local circuits differentially wound upon a relay-core, said local circuits being closed through the armatures and back stops of said neutral main-line relays, substantially as specified.

6. A local relay having a double set of differential windings or helices which form parts of local circuits.

7. A local relay having a double set of differential helices which form parts of local circuits, in combination with two local batteries, the first for charging one set of differential helices and the second for charging the other set.

8. A local relay provided with four helices differentially wound in respect to each other, and so arranged in local circuits that the core may be successively neutral, magnetic, or neutral and magnetic by breaking or closing in proper order the local circuits including the several differential coils.

9. A double differentially-wound local relay, each set of whose differential windings is connected with a local battery, while three of the four local circuit branches, including the differential coils, are each opened and closed respectively by the neutral main-line relays.

10. At a receiving-station upon a telegraph-line for simultaneous transmission, two local sounders, each brought into action by different strengths of main-line currents, in combination with a double differentially-wound local relay actuating one of said local sounders, and a relay placed in one of the local branches of the double differentially-wound relay for actuating the second local sounder, substantially as specified.

11. In a receiving apparatus for multiple telegraphy, a double differential local relay, in combination with a system of main-line relays, which operate in succession by successive increases of main-line current, whereby one strength of main-line current causes the operation of the double differential relay to give a signal, a second or increased strength of main-line current renders the double differential relay inoperative, but causes a signal to be given upon an additional device, while upon a third or further increase in strength of main-line current the double differential relay is operated to give a signal as well as the device responding to give a signal upon the preceding strength of current.

12. The combination of local relays R S and D S, main-line relays R′ R″ R‴, and circuit-connections, the said main-line relays being operated in succession by successive increases and decreases in strength of the main-line current, one strength rendering D S magnetic to give a signal, a second strength rendering it neutral, whereby it can give no signal, but said second strength of current at the same time causing R S to be energized to give a signal, while a third strength causes both R S and D S to respond, substantially as specified.

13. The combination of relays R S and D S, relay D S having branches e f g h, of which e, g, and h may be broken, in combination with main-line relays R′ R″ R‴, arranged and operated as described, a weak current operating R′ and breaking branch g of D S to give a signal, a stronger current operating R′ and R″ to break branches g and h to render D S neutral and silent and R S operative, and a still stronger main-line current operating R′, R″, and R‴ to break branches e g h, whereby both R S and D S are actuated to give signals.

14. In combination with relay D S and its differential coils and local branch circuits, the relay R S, placed in branch h, whereby the second strength of main-line current simultaneously causes the operation of R S and neutralization of D S.

15. A double differential relay, D S, whose coils h and p are so wound in respect to the local batteries by which they are charged that the currents of electricity will, in passing around relay D S through coils h f, induce superposed magnetism of the same polarity in the ends of the core D S, whereby, when the magnetism of the core is first due to currents in coil of branch f and then to currents in coil of branch h, a magnetic reversal in said core will not occur.

16. The combination of a relay whose tongue is adjusted to be responsive only to strong currents of electricity, a relay in the same line whose tongue is responsive both to weak and strong currents, and an auxiliary retracting device which is automatically brought to the assistance of the retractor of the relay which is responsive to weak currents, said auxiliary retracting device being brought into action only upon the operation of the relay which is responsive to strong currents.

17. The combination, as set forth, of relay R′, armature-lever o′, retractor s, local electro-magnet m, relay R″, armature o″, and local circuit, including battery B, which is opened and closed by armature o″, whereby the strength of current sufficient to actuate armature of relay R″ will automatically bring local electro-magnet m into action to aid retractile force of spring s in amount corresponding with the increase of current strength for which spring s is adjusted.

18. In combination with local relays R S and D S, local branches e, f, g, and h, so arranged that $g$ and $h$ are broken by action of relays $R'$ and $R''$, while branch $e$ is broken by an increased strength of current through the agency of relay $R'''$.

19. Armature-levers $o''$ and $o'''$ of relays $R''$ and $R'''$, provided with continuity-preserving devices, in combination with local electro-magnets $m$ and $m'$, whereby the retractile force of $m$ and $m'$ may not be varied by slight movement of arms $o''$ or $o'''$ upon the reversal of line-currents.

20. The combination of the relay-arm $o''$ of $R''$ and spring 40 with local retracting electro-magnet $m$ of relay $R'$, whereby the action of $m$ may be uniform upon reversing the line-currents.

FRANCIS W. JONES.

Witnesses:
    WILLIAM Y. H. BOK,
    WILLIAM ARNOUX.